US012571321B2

(12) United States Patent
Liles

(10) Patent No.: US 12,571,321 B2
(45) Date of Patent: Mar. 10, 2026

(54) RADIAL SEAL BETWEEN CMC VANE AND VANE SUPPORT

(71) Applicant: RTX CORPORATION, Farmington, CT (US)

(72) Inventor: Howard J. Liles, Newington, CT (US)

(73) Assignee: RTX CORPORATION, Farmington, CT (US)

( * ) Notice: Subject to any disclaimer, the term of this patent is extended or adjusted under 35 U.S.C. 154(b) by 0 days.

(21) Appl. No.: 18/455,265

(22) Filed: Aug. 24, 2023

(65) Prior Publication Data

US 2025/0067187 A1 Feb. 27, 2025

(51) Int. Cl.
*F01D 5/28* (2006.01)
*F01D 25/12* (2006.01)

(52) U.S. Cl.
CPC ............. *F01D 5/282* (2013.01); *F01D 25/12* (2013.01); *F05D 2240/55* (2013.01); *F05D 2300/6033* (2013.01)

(58) Field of Classification Search
CPC . F01D 5/18; F01D 5/282; F01D 5/284; F01D 9/02; F01D 9/04; F01D 9/041; F01D 9/06; F01D 11/00; F01D 11/005; F01D 25/12; F05D 2240/55; F05D 2300/6033
See application file for complete search history.

(56) References Cited

U.S. PATENT DOCUMENTS 4,384,822 A 5/1983 Schweikl et al.
4,396,349 A * 8/1983 Hueber .................. F01D 5/284 415/137
5,078,576 A 1/1992 Hayton
5,129,783 A 7/1992 Hayton
6,464,456 B2 10/2002 Darolia et al.
(Continued)

FOREIGN PATENT DOCUMENTS

EP 4053377 A2 9/2022
EP 4080017 A1 10/2022

OTHER PUBLICATIONS

European Search Report for European Patent Application No. 24196248.9 mailed Feb. 5, 2025.

*Primary Examiner* — Courtney D Heinle
*Assistant Examiner* — Cameron A Corday
(74) *Attorney, Agent, or Firm* — Carlson, Gaskey & Olds, P.C.

(57) ABSTRACT

A gas turbine engine includes a ceramic matrix composite (CMC) vane arc segment that has first and second platforms and an airfoil section that extends radially therebetween. The airfoil section includes an internal through-cavity, and the first and second platforms include, respectively, platform inlet and outlet ports connected to the internal through-cavity for conveying cooling air. The CMC vane arc segment is radially mounted between first and second metallic vane supports. The second metallic vane support includes a plenum and a plenum inlet port connected with the platform outlet port for receiving the cooling air from the internal through-cavity. There is a seal located radially between the second platform and the second metallic vane support. The seal circumscribes the platform outlet port to limit leakage of the cooling air between the second platform and the second metallic vane support.

9 Claims, 5 Drawing Sheets

(56) References Cited

U.S. PATENT DOCUMENTS

| | | | | |
|---|---|---|---|---|
| 7,452,189 | B2 * | 11/2008 | Shi | F01D 5/147 416/241 B |
| 9,617,920 | B2 * | 4/2017 | Headland | F02C 7/28 |
| 10,094,239 | B2 * | 10/2018 | Freeman | F01D 5/282 |
| 11,391,163 | B1 * | 7/2022 | Liles | F01D 5/189 |
| 11,473,444 | B2 * | 10/2022 | Generale | F01D 5/284 |
| 12,025,029 | B1 * | 7/2024 | Heylmun | F01D 9/042 |
| 2002/0127097 | A1 * | 9/2002 | Darolia | F01D 9/042 415/137 |
| 2012/0306169 | A1 * | 12/2012 | Giri | F16J 15/0887 277/650 |
| 2020/0025025 | A1 * | 1/2020 | Sippel | F01D 9/041 |
| 2021/0140341 | A1 | 5/2021 | Generale et al. | |

* cited by examiner

RADIAL SEAL BETWEEN CMC VANE AND VANE SUPPORT

BACKGROUND

A gas turbine engine typically includes a fan section, a compressor section, a combustor section and a turbine section. Air entering the compressor section is compressed and delivered into the combustion section where it is mixed with fuel and ignited to generate a high-pressure and temperature exhaust gas flow. The high-pressure and temperature exhaust gas flow expands through the turbine section to drive the compressor and the fan section. The compressor section may include low and high pressure compressors, and the turbine section may also include low and high pressure turbines.

Airfoils in the turbine section are typically formed of a superalloy and may include thermal barrier coatings to extend temperature capability and lifetime. Ceramic matrix composite ("CMC") materials are also being considered for airfoils. Among other attractive properties, CMCs have high temperature resistance. Despite this attribute, however, there are unique challenges to implementing CMCs in airfoils.

SUMMARY

A gas turbine engine according to an example of the present disclosure includes a ceramic matrix composite (CMC) vane arc segment that includes first and second platforms and an airfoil section that extends radially therebetween. The airfoil section has an internal through-cavity. The first and second platforms have, respectively, platform inlet and outlet ports connected to the internal through-cavity for conveying cooling air. First and second metallic vane supports are radially mounted between the first and second metallic vane supports. The second metallic vane support has a plenum and a plenum inlet port connected with the platform outlet port for receiving the cooling air from the internal through-cavity. A seal is located radially between the second platform and the second metallic vane support. The seal circumscribes the platform outlet port to limit leakage of the cooling air between the second platform and the second metallic vane support.

In a further embodiment of any of the foregoing embodiments, the seal is a rope seal.

In a further embodiment of any of the foregoing embodiments, the rope seal includes ends that are secured together such that the rope seal is a continuous ring.

In a further embodiment of any of the foregoing embodiments, the seal is a tadpole seal having a bulb section and a tail section extending from the bulb section.

A further embodiment of any of the foregoing embodiments includes at least one fastener securing the tail section to the second metallic vane support.

In a further embodiment of any of the foregoing embodiments, the at least one fastener comprises a pin that extends through a hole in the tail section.

In a further embodiment of any of the foregoing embodiments, the at least one fastener comprises a retainer clip clamping onto the tail section.

In a further embodiment of any of the foregoing embodiments, the second metallic support is a tangential onboard injector (TOBI).

In a further embodiment of any of the foregoing embodiments, the TOBI includes fore and aft annular walls and an outer diameter annular wall. The fore and aft annular walls and the outer diameter annular wall define the plenum therebetween. The TOBI has an axially-oriented nozzle for discharging the cooling air from the plenum in an aft direction.

In a further embodiment of any of the foregoing embodiments, the second metallic vane support includes a seal groove in which the seal is at least partially disposed.

In a further embodiment of any of the foregoing embodiments, the second metallic vane support includes first and second eyelets that each open on one end thereof to a side face of the second metallic vane support and on an opposed end thereof to the seal groove. The seal is routed through the first and second eyelets.

In a further embodiment of any of the foregoing embodiments, the vane arc segment includes a spar extending through the internal through-cavity and protruding from the second platform. The seal circumscribes the spar.

A gas turbine engine according to an example of the present disclosure includes a ceramic matrix composite (CMC) vane arc segment that has first and second platforms and an airfoil section that extends radially therebetween. The airfoil section has an internal through-cavity receiving pressurized cooling air. The first and second platforms have, respectively, platform inlet and outlet ports connected to the internal through-cavity conveying the pressurized cooling air. A tangential onboard injector (TOBI) radially supports the CMC vane arc segment. The TOBI has a plenum and a plenum inlet port connected with the platform outlet port. The plenum receives the pressurized cooling air from the internal through-cavity via the plenum inlet port. A seal is located radially between the second platform and the TOBI. The seal circumscribes the platform outlet port and limiting leakage of the pressurized cooling air between the second platform and the TOBI. The pressurized cooling air loads the vane arc segment against the seal causing the seal to compress.

In a further embodiment of any of the foregoing embodiments, the seal is selected from the group consisting of a rope seal and a tadpole seal.

In a further embodiment of any of the foregoing embodiments, the TOBI includes fore and aft annular walls and an outer diameter annular wall. The fore and aft annular walls and the outer diameter annular wall define the planum therebetween. The TOBI has an axially-oriented nozzle for discharging the cooling air from the plenum in an aft direction.

In a further embodiment of any of the foregoing embodiments, the TOBI includes a seal groove in which the seal is at least partially disposed, first and second eyelets that each open on one end thereof to a side face of the TOBI and on an opposed end thereof to the seal groove, and the seal is routed through the first and second eyelets.

The present disclosure may include any one or more of the individual features disclosed above and/or below alone or in any combination thereof.

BRIEF DESCRIPTION OF THE DRAWINGS

The various features and advantages of the present disclosure will become apparent to those skilled in the art from the following detailed description. The drawings that accompany the detailed description can be briefly described as follows.

Figure 1:
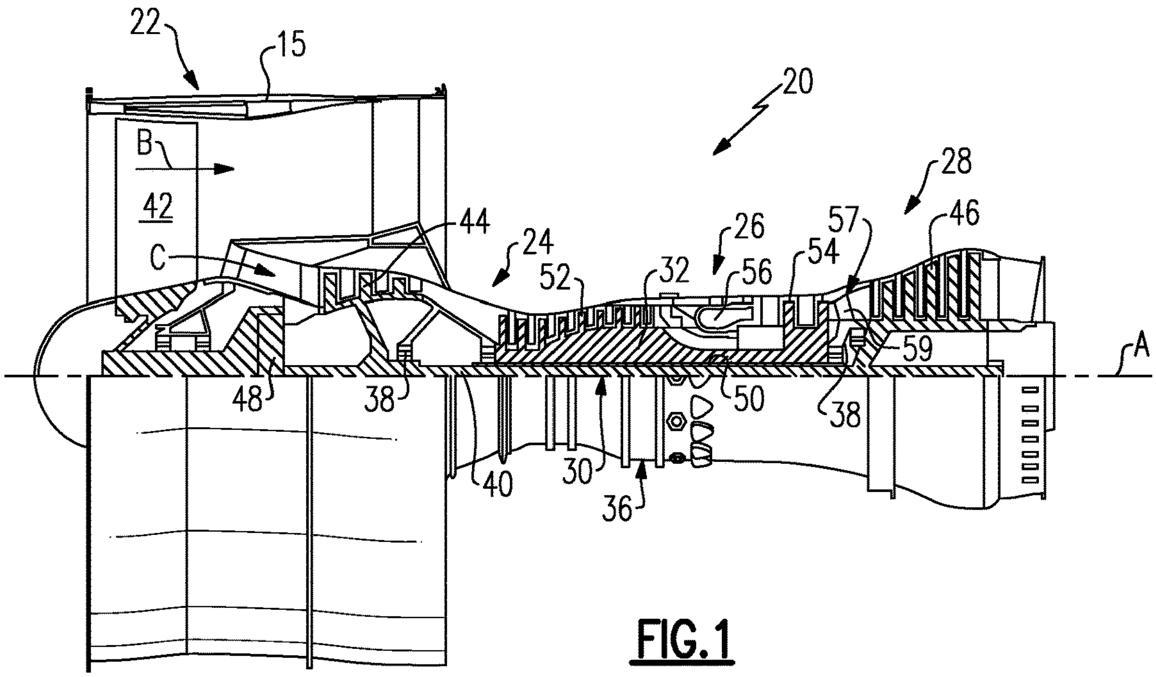
FIG. 1 illustrates a gas turbine engine.

In this disclosure, like reference numerals designate like elements where appropriate and reference numerals with the addition of one-hundred or multiples thereof designate modified elements that are understood to incorporate the same features and benefits of the corresponding elements. Terms such as “first” and “second” used herein are to differentiate that there are two architecturally distinct components or features. Furthermore, the terms “first” and “second” are interchangeable in that a first component or feature could alternatively be termed as the second component or feature, and vice versa.

DETAILED DESCRIPTION

FIG. 1 schematically illustrates a gas turbine engine 20. The gas turbine engine 20 is disclosed herein as a two-spool turbofan that generally incorporates a fan section 22, a compressor section 24, a combustor section 26 and a turbine section 28. The fan section 22 drives air along a bypass flow path B in a bypass duct defined within a housing 15 such as a fan case or nacelle, and also drives air along a core flow path C for compression and communication into the combustor section 26 then expansion through the turbine section 28. Although depicted as a two-spool turbofan gas turbine engine in the disclosed non-limiting embodiment, it should be understood that the concepts described herein are not limited to use with two-spool turbofans as the teachings may be applied to other types of turbine engines including three-spool architectures.

The exemplary engine 20 generally includes a low speed spool 30 and a high speed spool 32 mounted for rotation about an engine central longitudinal axis A relative to an engine static structure 36 via several bearing systems 38. It should be understood that various bearing systems 38 at various locations may alternatively or additionally be provided, and the location of bearing systems 38 may be varied as appropriate to the application.

The low speed spool 30 generally includes an inner shaft 40 that interconnects, a first (or low) pressure compressor 44 and a first (or low) pressure turbine 46. The inner shaft 40 is connected to the fan 42 through a speed change mechanism, which in exemplary gas turbine engine 20 is illustrated as a geared architecture 48 to drive a fan 42 at a lower speed than the low speed spool 30. The high speed spool 32 includes an outer shaft 50 that interconnects a second (or high) pressure compressor 52 and a second (or high) pressure turbine 54. A combustor 56 is arranged in the exemplary gas turbine 20 between the high pressure compressor 52 and the high pressure turbine 54. A mid-turbine frame 57 of the engine static structure 36 may be arranged generally between the high pressure turbine 54 and the low pressure turbine 46. The mid-turbine frame 57 further supports bearing systems 38 in the turbine section 28. The inner shaft 40 and the outer shaft 50 are concentric and rotate via bearing systems 38 about the engine central longitudinal axis A which is collinear with their longitudinal axes.

The core airflow is compressed by the low pressure compressor 44 then the high pressure compressor 52, mixed and burned with fuel in the combustor 56, then expanded through the high pressure turbine 54 and low pressure turbine 46. The mid-turbine frame 57 includes airfoils 59 which are in the core airflow path C. The turbines 46, 54 rotationally drive the respective low speed spool 30 and high speed spool 32 in response to the expansion. It will be appreciated that each of the positions of the fan section 22, compressor section 24, combustor section 26, turbine section 28, and fan drive gear system 48 may be varied. For example, gear system 48 may be located aft of the low pressure compressor, or aft of the combustor section 26 or even aft of turbine section 28, and fan 42 may be positioned forward or aft of the location of gear system 48.

The engine 20 in one example is a high-bypass geared aircraft engine. In a further example, the engine 20 bypass ratio is greater than about six (6), with an example embodiment being greater than about ten (10), and can be less than or equal to about 18.0, or more narrowly can be less than or equal to 16.0. The geared architecture 48 is an epicyclic gear train, such as a planetary gear system or other gear system, with a gear reduction ratio of greater than about 2.3. The gear reduction ratio may be less than or equal to 4.0. The low pressure turbine 46 has a pressure ratio that is greater than about five. The low pressure turbine pressure ratio can be less than or equal to 13.0, or more narrowly less than or equal to 12.0. In one disclosed embodiment, the engine 20 bypass ratio is greater than about ten (10:1), the fan diameter is significantly larger than that of the low pressure compressor 44, and the low pressure turbine 46 has a pressure ratio that is greater than about five 5:1. Low pressure turbine 46 pressure ratio is pressure measured prior to an inlet of low pressure turbine 46 as related to the pressure at the outlet of the low pressure turbine 46 prior to an exhaust nozzle. The geared architecture 48 may be an epicycle gear train, such as a planetary gear system or other gear system, with a gear reduction ratio of greater than about 2.3:1 and less than about 5:1. It should be understood, however, that the above parameters are only exemplary of one embodiment of a geared architecture engine and that the present invention is applicable to other gas turbine engines including direct drive turbofans.

A significant amount of thrust is provided by the bypass flow B due to the high bypass ratio. The fan section 22 of the engine 20 is designed for a particular flight condition—typically cruise at about 0.8 Mach and about 35,000 feet (10,668 meters). The flight condition of 0.8 Mach and 35,000 ft (10,668 meters), with the engine at its best fuel consumption—also known as “bucket cruise Thrust Specific Fuel Consumption (‘TSFC’)”—is the industry standard parameter of lbm of fuel being burned divided by lbf of thrust the engine produces at that minimum point. The engine parameters described above and those in this paragraph are measured at this condition unless otherwise specified. “Low fan pressure ratio” is the pressure ratio across the fan blade alone, without a Fan Exit Guide Vane (“FEGV”) system. The low fan pressure ratio as disclosed herein according to one non-limiting embodiment is less than about 1.45, or more narrowly greater than or equal to 1.25. “Low corrected fan tip speed” is the actual fan tip speed in ft/sec divided by an industry standard temperature correction of $[(\text{Tram}° \text{ R})/(518.7° \text{ R})]^{0.5}$. The “Low corrected fan tip speed” as disclosed herein according to one non-limiting embodiment is less than about 1150.0 ft/second (350.5 meters/second), and can be greater than or equal to 1000.0 ft/second (304.8 meters/second).

Figure 2:
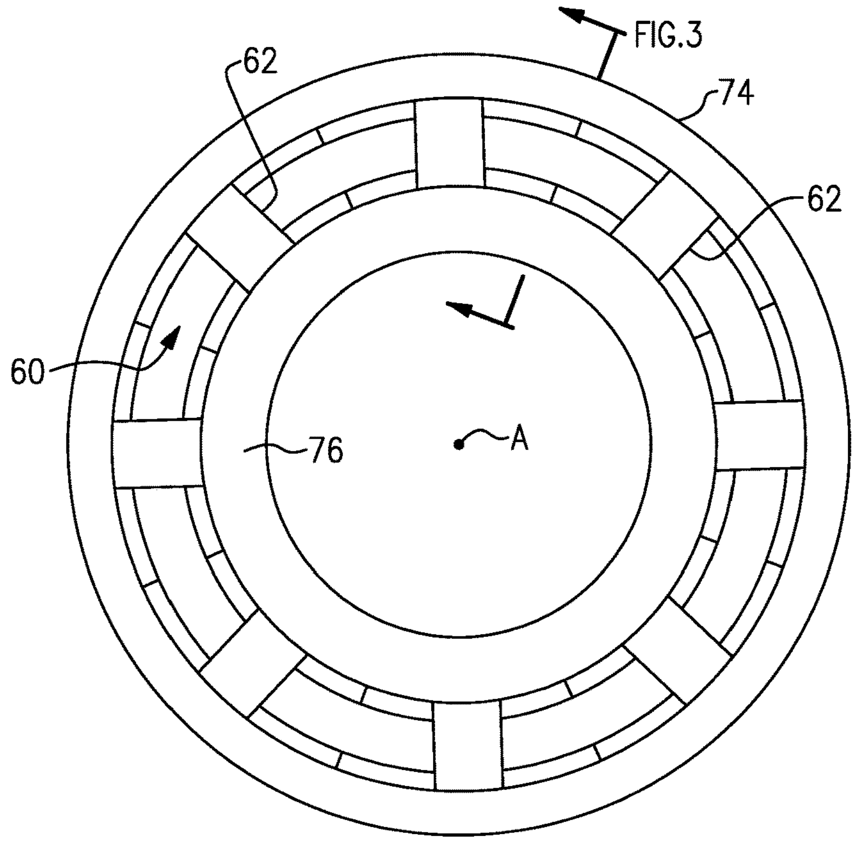
FIG. 2 illustrates an axial view of a portion of the turbine section of the engine.
Figure 3:
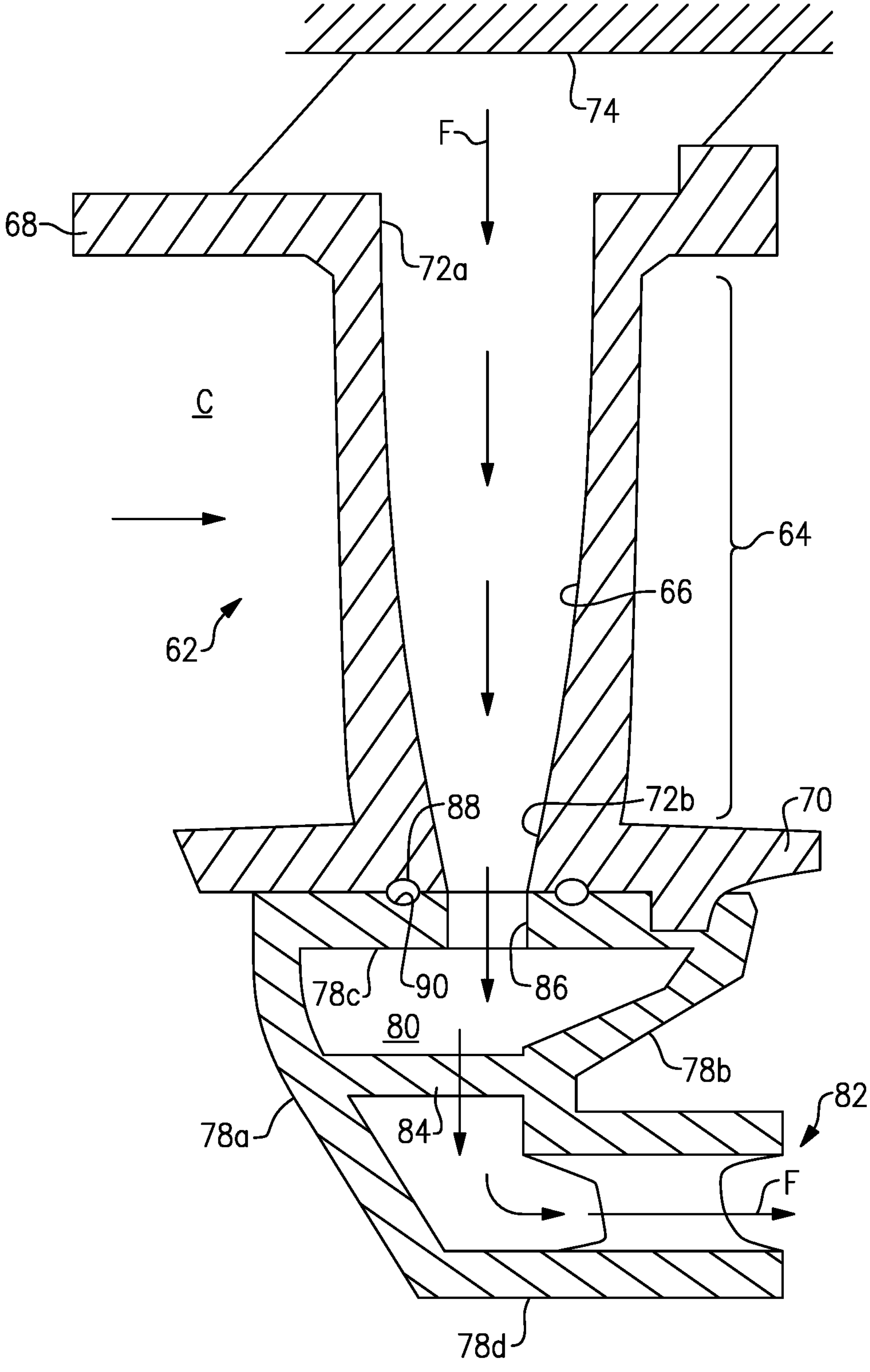
FIG. 3 illustrates a sectioned view of the turbine from the circumferential direction.

FIG. 2 illustrates an axial view of a portion of the turbine section 28 of the engine 20, and FIG. 3 illustrates a sectioned view from the circumferential direction. The turbine section 28 includes a circumferential row 60 of vane arc segments 62 that are arranged about the engine central longitudinal axis A. Each vane arc segment 62 (FIG. 3) is comprised of an airfoil section 64 that has an internal through-cavity 66 and first (outer) and second (inner) platforms 68/70 between which the airfoil section 64 extends. The internal through-cavity 66 is connected with a platform inlet port 72*a* in the first platform 68 and a vane outlet port 72*b* in the second platform 70, for conveying cooling air flow F through the vane arc segment 62, such as bleed air from the compressor section 24. The platforms 68/70 provide radially outer and inner bounds of the core gas path C. The terms such as "inner" and "outer" refer to location with respect to the central engine axis A, i.e., radially inner or radially outer. Moreover, the terminology "first" and "second" as used herein is to differentiate that there are two architecturally distinct components or features. It is to be further understood that the terms "first" and "second" are interchangeable in the embodiments herein in that a first component or feature could alternatively be termed as the second component or feature, and vice versa.

The vane arc segments 62 are formed of a ceramic matrix composite ("CMC"). A CMC is formed of ceramic fiber tows that are disposed in a ceramic matrix. As an example, the CMC may be, but is not limited to, a SiC/SiC composite in which SiC fiber tows are disposed within a SiC matrix. The fiber tows are arranged in a fiber architecture, which refers to an ordered arrangement of the tows relative to one another, such as a braided or woven architecture.

The vane arc segments 62 are radially supported through the platform 68 by one or more first metallic supports 74. For example, the support or supports 74 may be an engine case or an intermediate structure, such as a spar or carrier, that attaches to an engine case. The vane arc segments 62 may be supported by a flange or flanges, or other features designed for CMC vane attachment. The vane arc segments 62 are supported at the inner diameter by a second metallic support 76. In the example shown, the second metallic support 76 is a tangential onboard injector (TOBI), although it is to be understood that the examples herein are also applicable at the first metallic support 74 and to supports other than TOBIs. The metallic supports 74/76 are formed of an alloy, such as but not limited to, nickel- or cobalt-based alloys.

As shown in FIG. 3, the TOBI 76 includes fore and aft annular walls 78*a*/78*b*, an outer diameter annular wall 78*c*, and an inner diameter annular wall 78*d*. The walls 78*a*/78*b*/78*c*/78*d* define there between an annular plenum 80. The TOBI 76 includes a plurality of axially-oriented nozzles 82 for discharging the cooling air flow from the plenum 80 in an aft direction. For instance, the nozzles 82 may include fins, guide vanes, or other structures that facilitate guiding of the cooling air flow. Optionally, the TOBI 76 may include an internal rib 84, to add strength and/or facilitate control of the cooling air flow.

The vane arc segments 62 are situated on the outer diameter annular wall 80 such that the TOBI 76 radially supports each of the vane arc segments 62. In this regard, at least a portion of the surface of the outer diameter annular wall 78*c* is in interfacial contact with the inner diameter surface of the inner platform 70. Such interfacial contact may facilitate load distribution and secondary sealing between the TOBI 76 and the vane arc segments 62.

The outer diameter annular wall 78*c* includes plenum inlet ports 86 that are connected, respectively, with the platform outlet ports 72*b* to receive the cooling air flow from each of the vane arc segments 62 into the plenum 80. For example, the ports 72*b*/86 are approximately equal in area and are radially aligned with each other. The cross-sectional flow area of the ports 72*b*/86 may be selected to meter the cooling air flow for a desired downstream cooling effect, to provide pressures that reduce leakage, and/or to reduce pressure-driven stresses in the TOBI 76.

In general, a TOBI is a structure in a gas turbine engine at an inner diameter location of the turbine vanes that receives cooling air from the vanes and redirects the cooling air through nozzles in an axially aft direction to cool downstream components, such as a portion of a turbine disc. The cooling air that is provided to the vane arc segments 62, and subsequently to the TOBI 76, is generally at a higher pressure than the pressure in the core gaspath C (e.g., at cruise). As a result, the interfaces where the TOBI 76 and the vane arc segments 62 meet are potentially subject to leakage of cooling air into the core gaspath C. In addition to the pressure differential, a further challenge to limiting such leakage is that the CMC material of the vane arc segments 62 and the alloy of the TOBI differ in coefficient of thermal expansion, thereby causing changes in the gap sizes that provide potential leak paths over the relevant operating temperature range. Such thermal differences may also challenge retention and proper positioning of a seal in a space that could vary in size over the temperatures range.

In these regards, a seal 88 is provided in the interface radially between the outer diameter annular wall 80 and the platform 70 for limiting leakage of the cooling air. For instance, the seal 88 is a ring that circumscribes the ports 72*b*/86 to seal the interface. In the illustrated example, the seal 88 is a rope seal. A rope seal is formed of high-temperature resistance fibers, such as ceramic fibers. The fibers may be braided, knitted, or woven. Example ceramic fibers include, but are not limited to, oxide fibers. For instance, the ceramic fibers are NEXTEL fibers, which are composed of $Al_2O_3$, $SiO_2$, and $B_2O_3$. Optionally, a rope seal may include a sheath surrounding a fiber core. The sheath can be an overbraid or foil that surrounds a fiber core.

Figure 4:
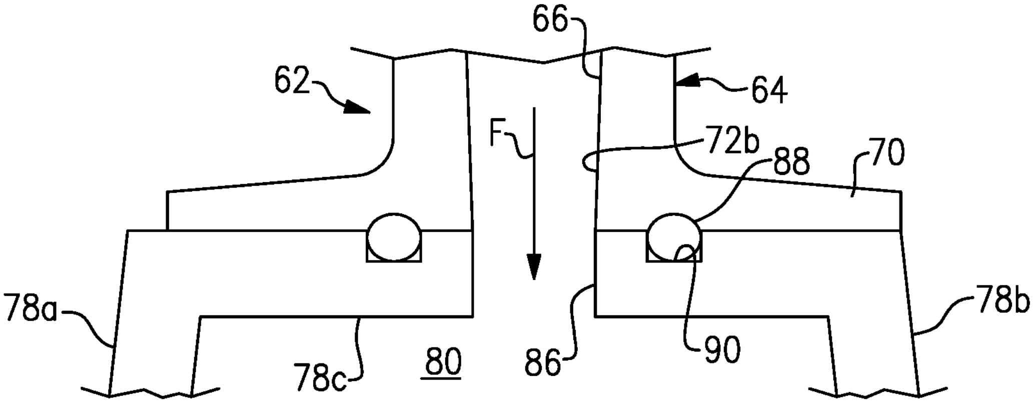
FIG. 4 illustrates a vane arc segment and a seal.

As also shown in FIG. 4, the outer diameter annular wall 78*c* of the TOBI 76 includes a seal groove 90 in which the seal 88 is at least partially disposed. In the example shown, the thickness of the seal 88 is greater than the depth of the seal groove 90 such that the seal 88 seats in the seal groove 90 but protrudes above the surface of the outer diameter annular wall 78*c*. The inner diameter surface of the second platform 70 is substantially flat and seats radially against the seal 88. The higher pressure of the cooling air flowing through the vane arc segment 62 relative to the pressure in the core gaspath C serves to bias the vane arc segment 62 toward the TOBI 76, thereby compressively loading the seal 88. The compression loading limits seal movement and thus facilitates confinement of the seal 88 to maintain the seal 88 in a proper sealing position in in the seal groove 90 and to reduce the potential for the seal 88 to liberate from the interface. The compression loading also in essence acts as a "spring" to take up thermal size variations. Moreover, as the seal 88 closely circumscribes the ports 72*b*/86, the perimeter length for potential leakage is reduced in comparison to sealing around the longer length of the perimeter of the platform 70.

Figure 5:
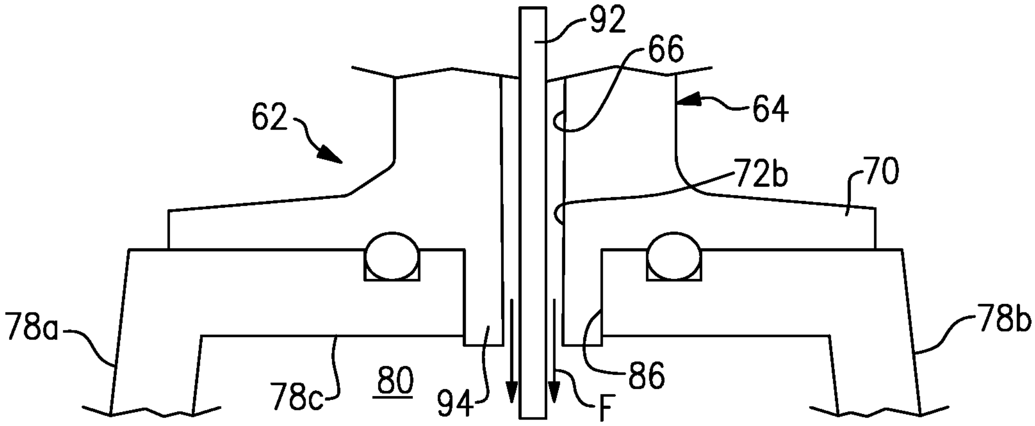
FIG. 5 illustrates another example of a vane arc segment and a seal.

FIG. 5 illustrates another embodiment of the vane arc segment 62 that is similar to that of FIG. 4 except that the vane arc segment 62 includes a spar 92 that extends through the internal through-cavity 66 and the platform outlet port 72*b* includes a radial collar 94. The radial collar 94 protrudes into the plenum inlet port 86 and may serve as a pilot for positioning of the vane arc segment 62 on the TOBI 76. The spar 92 is attached at its outer end to the first support 74, while the inner end of the spar 92 radially protrudes from the second platform 70 into the plenum 80 of the TOBI 76. The seal 88 circumscribes the spar 92. In that regard, the spar 92 serves to stake the seal 88 and thereby prevent the seal 88 from completely liberating from the interface, as the seal 88, even if it were to dislodge, is unable to move over the end of the spar 92.

Figure 6:
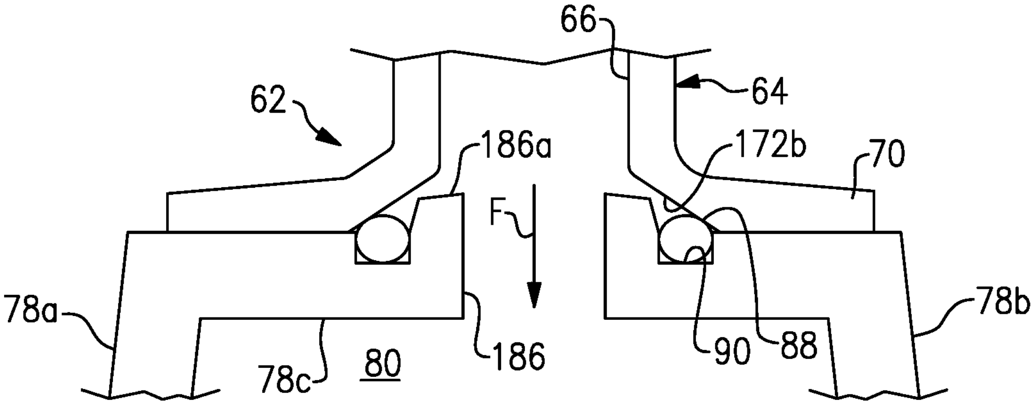
FIG. 6 illustrates another example vane arc segment and a seal.

FIG. 6 illustrates another embodiment of the vane arc segment 62. In this example, the platform outlet port 172*b* is beveled and the plenum inlet port 186 includes a radial collar 186*a* that protrudes into the platform outlet port 172*b* and defines a side of the seal groove 90. The seal 88 is wedged in the seal groove 90 between the outside surface of the radial collar 186*a* and the bevel face of the platform outlet port 172*b*. The compressive loading on the seal 88 by the oblique angle of the bevel face urges the seal 88 laterally against the outside surface of the radial collar 186*a* to facilitate maintaining the seal in proper sealing position.

Figure 7:
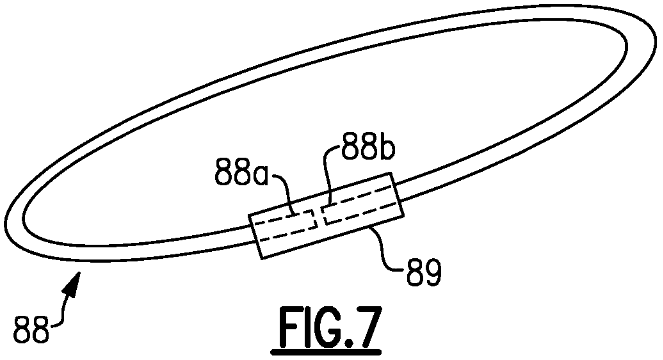
FIG. 7 illustrates an isolated view of an example of a seal.

FIG. 7 shows an isolated view of an example of the seal 88. In this example, the seal 88 is a rope seal that includes ends 88*a*/88*b* that are secured together such that the rope seal is a continuous ring. For instance, the seal 88 includes a connector 89 that joins the ends 88*a*/88*b* together. In one example, the connector 89 is a crimped connector that is plastically deformed to pinch onto the ends 88*a*/88*b*. Alternatively, the connector 89 is comprised of a fusion of the ends 88*a*/88*b*.

Figure 8:
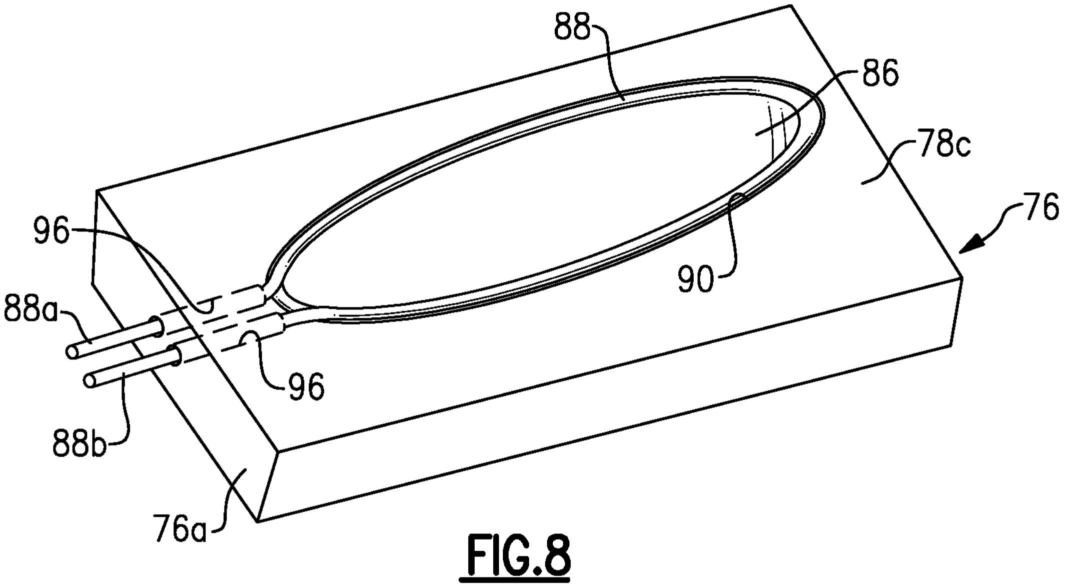
FIG. 8 illustrates a further example in which the outer diameter annular wall of a TOBI includes a pair of eyelets.

FIG. 8 illustrates a further example in which the outer diameter annular wall 78*c* of the TOBI 76 includes a pair of eyelets 96 for each vane arc segment 62. Each eyelet 96 is an internal passage within the wall 78*b* that opens on one end to a side face 76*a* of the TOBI 76 and on an opposed end to the seal groove 90. The seal 88 is routed in through one of the eyelets 96, around the seal groove 90, and then out through the other eyelet 96. The eyelets 96 are contiguous such that the seal completely or substantially completely encompasses the plenum inlet port 86 with little or no gap. Optionally, the ends 88*a*/88*b* of the seal that protrude from the eyelets 96 at the side face 76*a* are joined together, such as by the aforementioned connector 89. The eyelets 96 constrain movement of the seal 88 and thus facilitate maintaining the seal 88 in a proper sealing position.

Figure 9:
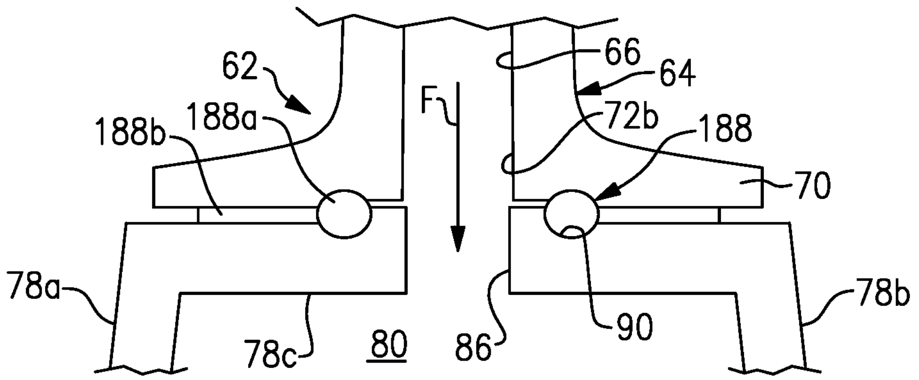
FIG. 9 illustrates an example of a tadpole seal.

FIG. 9 illustrates another example that is similar to that of FIG. 4 except that the seal 188 is a tadpole seal. The tadpole seal 188 has a bulb section 188*a* and a tail section 188*b* that extends from the bulb section 188*a*. For example, the bulb section includes a fibrous core, similar to a rope seal, and the tail section 188*b* is formed by a fabric, overbraid, or foil that loops around the fibrous core. The bulb section 188*a* is disposed in the seal groove 90, while the tail section 188*b* overhangs the side of the seal groove 90 and extends into the interface between the surface of the platform 70 and the surface of the outer diameter annular wall 78*c*. The bulb section 188*a* serves as a primary seal, while the tail section 188*b* serves for secondary sealing in the interface.

Figure 10:
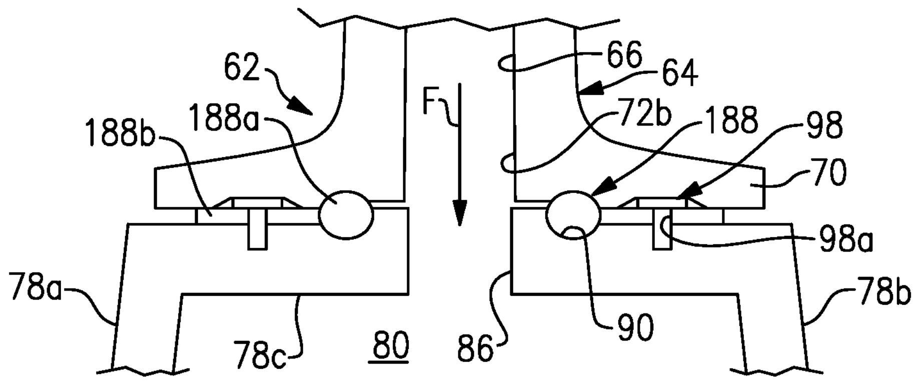
FIG. 10 illustrates an example in which a fastener that secures the tail section of the tadpole seal.

In a further example depicted in FIG. 10, there is at least one fastener 98 that secures the tail section 188*b* to the TOBI 76. For instance, the fastener 98 as shown is a pin that extends through a hole 98*a* in the tail section 188*b* and anchors (e.g., by weldment) in the outer diameter annular wall 78*c* of the TOBI 76.

Figure 11:
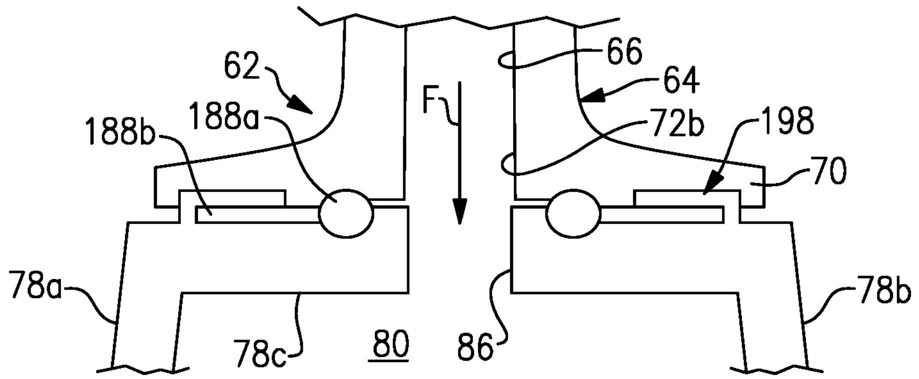
FIG. 11 illustrates an example in which the fastener is a retainer clip that clamps onto the tail section of the tadpole seal.

In another example shown in FIG. 11, the fastener 198 is a retainer clip that clamps onto the tail section 188*b*. In one example, the outer diameter annular wall 78*c* of the TOBI 76 includes multiple discrete retainer clips arranged around the perimeter of the plenum inlet port 86. In another example, the outer diameter annular wall 78*c* of the TOBI 76 includes a single continuous retainer clip that extends around the perimeter of the plenum inlet port 86.

Although a combination of features is shown in the illustrated examples, not all of them need to be combined to realize the benefits of various embodiments of this disclosure. In other words, a system designed according to an embodiment of this disclosure will not necessarily include all of the features shown in any one of the Figures or all of the portions schematically shown in the Figures. Moreover, selected features of one example embodiment may be combined with selected features of other example embodiments.

The preceding description is exemplary rather than limiting in nature. Variations and modifications to the disclosed examples may become apparent to those skilled in the art that do not necessarily depart from this disclosure. The scope of legal protection given to this disclosure can only be determined by studying the following claims.

What is claimed is:

1. A gas turbine engine comprising:

a ceramic matrix composite (CMC) vane arc segment including first and second platforms and an airfoil section extending radially therebetween, the airfoil section including an internal through-cavity, the first and second platforms including, respectively, platform inlet and outlet ports connected to the internal through-cavity for conveying cooling air;

first and second metallic vane supports, the CMC vane arc segment being radially mounted between the first and second metallic vane supports, the second metallic vane support including a plenum and a plenum inlet port connected with the platform outlet port for receiving the cooling air from the internal through-cavity, wherein the second metallic vane support includes a seal groove circumscribing the plenum inlet port; and a seal located radially between the second platform and the second metallic vane support, the seal circumscribing the platform outlet port to limit leakage of the cooling air between the second platform and the second metallic vane support, and the seal is a tadpole seal having a bulb section disposed in the seal groove and a tail section extending from the bulb section and overhanging an outboard side of the seal groove relative to the plenum inlet port, the bulb section including a fibrous core and the tail section wrapping around the fibrous core, and the tail section selected from the group consisting of a fabric, an overbraid, and a foil.

2. The gas turbine engine as recited in claim 1, further comprising at least one fastener securing the tail section to the second metallic vane support.

3. The gas turbine engine as recited in claim 2, wherein the at least one fastener comprises a pin that extends through a hole in the tail section.

4. The gas turbine engine as recited in claim 2, wherein the at least one fastener comprises a retainer clip clamping onto the tail section.

5. The gas turbine engine as recited in claim 1, wherein the second metallic support is a tangential onboard injector (TOBI).

6. The gas turbine engine as recited in claim 5, wherein the TOBI includes fore and aft annular walls and an outer diameter annular wall, the fore and aft annular walls and the outer diameter annular wall defining the plenum therebetween, the TOBI including an axially-oriented nozzle for discharging the cooling air from the plenum in an aft direction.

7. A gas turbine engine comprising:

a ceramic matrix composite (CMC) vane arc segment including first and second platforms and an airfoil section extending radially therebetween, the airfoil section including an internal through-cavity receiving pressurized cooling air, the first and second platforms including, respectively, platform inlet and outlet ports connected to the internal through-cavity conveying the pressurized cooling air;

a tangential onboard injector (TOBI) radially supporting the CMC vane arc segment, the TOBI including a plenum and a plenum inlet port connected with the platform outlet port, the plenum receiving the pressurized cooling air from the internal through-cavity via the plenum inlet port, wherein the TOBI Includes a seal groove circumscribing the plenum inlet port; and a seal located radially between the second platform and the TOBI, the seal circumscribing the platform outlet port and limiting leakage of the pressurized cooling air between the second platform and the TOBI, the pressurized cooling air loading the vane arc segment against the seal causing the seal to compress, and the seal is a tadpole seal having a bulb section disposed in the seal groove and a tail section extending from the bulb section and overhanging an outboard side of the seal groove relative to the plenum inlet port, the bulb section including a fibrous core and the tail section wrapping around the fibrous core, and the tail section selected from the group consisting of a fabric, an overbraid, and a foil.

8. The gas turbine engine as recited in claim 1, wherein the tail section is the fabric.

9. The gas turbine engine as recited in claim 1, wherein there is an axial interface defined between the second platform and the second metallic vane support, and the tail section extends in the axial interface.

* * * * *